(12) United States Patent
Chapman

(10) Patent No.: US 7,752,449 B1
(45) Date of Patent: Jul. 6, 2010

(54) SYSTEM AND METHOD FOR GENERATING A NON-REPUDIATABLE RECORD OF A DATA STREAM

(75) Inventor: Peter Chapman, Kanata (CA)

(73) Assignee: Avaya, Inc., Basking Ridge, NJ (US)

( * ) Notice: Subject to any disclaimer, the term of this patent is extended or adjusted under 35 U.S.C. 154(b) by 1171 days.

(21) Appl. No.: 11/357,957

(22) Filed: Feb. 22, 2006

(51) Int. Cl.
| | |
|---|---|
| H04L 9/32 | (2006.01) |
| H04L 29/06 | (2006.01) |
| H04L 9/00 | (2006.01) |
| H04L 9/28 | (2006.01) |
| H04L 9/08 | (2006.01) |
| H04K 1/00 | (2006.01) |
| H04K 1/06 | (2006.01) |

(52) U.S. Cl. ................ 713/179; 713/160; 713/168; 713/171; 713/181; 380/28; 380/37; 380/43; 380/255; 380/278; 380/283

(58) Field of Classification Search ........... 713/160, 713/168, 171, 179, 181; 380/255, 37, 43, 380/28
See application file for complete search history.

(56) References Cited

U.S. PATENT DOCUMENTS

| | | | |
|---|---|---|---|
| 6,055,577 A * | 4/2000 | Lee et al. ............... 709/233 |
| 6,311,271 B1 * | 10/2001 | Gennaro et al. .......... 713/170 |
| 6,948,066 B2 | 9/2005 | Hind et al. ............... 713/168 |
| 7,627,747 B2 * | 12/2009 | Eckhardt et al. ......... 713/153 |
| 2005/0190919 A1 * | 9/2005 | Baer et al. ............... 380/270 |
| 2005/0243798 A1 * | 11/2005 | Dunn et al. .............. 370/352 |
| 2005/0265260 A1 * | 12/2005 | Zinin et al. .............. 370/255 |
| 2006/0015746 A1 * | 1/2006 | Kusudo et al. ........... 713/187 |
| 2006/0156418 A1 * | 7/2006 | Polozoff .................... 726/28 |
| 2006/0218390 A1 * | 9/2006 | Loughran et al. ......... 713/151 |
| 2006/0294361 A1 * | 12/2006 | Matusz et al. ............ 713/151 |
| 2008/0043686 A1 * | 2/2008 | Sperti et al. .............. 370/338 |
| 2008/0148063 A1 * | 6/2008 | Hanko et al. ............. 713/189 |

* cited by examiner

Primary Examiner—Aravind K Moorthy
(74) Attorney, Agent, or Firm—Ogilvy Renault LLP

(57) ABSTRACT

A system and method for generating a non-repudiatable record of a communications data stream is provided, which is applicable to real-time and quasi-real-time data streams. A binary communication data stream is captured and segmented into defined frames. A key frame is generated for each of a number of data frames containing integrity and authentication information. The key frame is inserted into the data stream to provide an authenticated data stream.

18 Claims, 7 Drawing Sheets

SYSTEM AND METHOD FOR GENERATING A NON-REPUDIATABLE RECORD OF A DATA STREAM

CROSS-REFERENCE TO RELATED APPLICATIONS

This is the first application filed for the present invention.

MICROFICHE APPENDIX

Not Applicable.

TECHNICAL FIELD

The present invention relates to data verification and security, and in particular to system methods for generating a non-repudiatable record of a data stream of a communication session.

BACKGROUND OF THE INVENTION

The recording of communications, such as telephone conversation has been readily utilized in law enforcement and legal transactions. Ensuring the authenticity of recording to make certain that they cannot be repudiated is essential. The identification of the parties involved in the communication has been typically provided by extrinsic evidence and is not integrated as part of the communication recording. The media utilized for recording and storage are generally unsecured and provide opportunity for tampering or altering the content raising the possibility that the content can be repudiated.

The growth of electronic data communications over media such as the Internet has presented new challenges in ensuring the integrity of communications, particularly when it comes to providing a non-repudiatable record of the communication. The growth of broadband data networks and data based communication media such as mobile phones, voice-over-IP (VOIP) systems, text messaging systems, and video conference systems expands the means by which legal transactions may occur for which there is a need for ensuring that an authenticated record is captured. However, these media provide limited ability to verify the authenticity or ensure the integrity of the communication for the transacting parties or users.

In situations where the digital data communication is captured for storage, the spectre of tampering with little or no possibility of detection brings into question the validity and authenticity of the record, particularly when the communication is of a legal nature. For example, current legal practices typically require a signature on a document transmitted by facsimile for authentication, a practice which has become less secure with current digital imaging technology and the ability to tamper with the document.

In addition, when an important real-time communication occurs, such as a voice call, in which capture of the conversation is beneficial, the onus is placed upon one of the transacting parties to ensure the communication is captured appropriately. Without the appropriate safeguards the captured data is open to modification, potentially leaving the integrity of the data and the responsible party open to question.

The process of sending data over broadband networks, such as Internet Protocol (IP) networks, has led to the development of encryption and user identification techniques such as private/public-key cryptography and digital signatures. These techniques provide important security tools to ensure that data is non-repudiatable, wherein the user is associated with a given set of data and the signer cannot deny participation with the signature. A trusted third party may manage and control the digital signature remotely from the parties involved in the communication. Similarly the use of digital signatures in data files provides a way of identifying the originating party of the file with some confidence. Both methods are applicable only to non-real-time data communication typical of e-mail or file based communication applications. These methods cannot be applied to real-time communications.

A digital signature associates a digital or numerical code with a set of electronic data. The code is generated using a private key that uniquely identifies the person that is approving the contents of the data. To create a digital signature, an encryption process, such as DES or Triple DES or AES (Advanced Encryption Standard) for example, is utilized with a private key to encrypt a hash of the data set. The hash, is a number generated from a string of data which is substantially smaller than the text itself. The hash is generated by a formula in such a way that it is extremely unlikely that some other text will produce the same hash. In the United States, the National Institute of Standards has approved certain digital signature algorithms. The private key is associated with a given user. Thereafter, a public key which corresponds to the private key can be utilized to decrypt the encrypted data to arrive at the original data set. The use of a public private key pair is such that one of the two keys is used to encrypt the data stream and the other key is required to decrypt it. By this process a public key can be used to encrypt a stream and only the holder of the private key can decrypt that stream. Conversely, a private key can be used to encrypt a digital data stream and any person can verify the authenticity of that data stream by ascertaining that a publicly available (published) public key can decrypt that stream. For all practical purposes, it is considered impossible to create a digital stream that can be decrypted with a particular public key, except with the use of the associated private key, using well established published algorithms.

Digital signatures provide security benefits of identification and authentication plus data integrity to arrive at non-repudiation. The identity of the signing person of a transaction is known and can be proven to a third party. The signature is linked to the user. The signature is also linked to the data being signed such that if the data is changed, the signature is invalidated. For non-repudiation, the signing party cannot deny having signed the transaction inasmuch as the signature is linked to the user and the data. The use of digital signatures has been limited to non-real-time transactions such as sending document or files via e-mail or other file transfer methods and has not been applicable to real-time or quasi-real-time communications.

The use of various digital communication media to send real-time or quasi (near) real-time data communications, such as voice, video and data have limited the ability to verify the authenticity of the communication and the participants involved. Security and authentication solutions have been implemented in the communication device, or at the user access point itself, increasing device complexity and compatibility issues, which hinder adoption. A telecommunications service provider's underlying data network, in addition to the growing integration of the Internet and the Public Switched Telephone Network (PSTN) provides the opportunity for capturing and storing all kinds of streaming data communications.

Therefore, there exists a need to provide for the generation of a non-repudiatable record of a real-time or quasi-real time communication session.

SUMMARY OF THE INVENTION

Accordingly, an object of the present invention is to provide systems and methods for generating a non-repudiatable record of real-time of quasi-real-time communication sessions.

Thus, an aspect of the present invention provides for a method of generating an authenticated record of a communications data stream comprising receiving authentication information associated with the communications data stream; capturing a communications data stream; segmenting the data stream into defined frames; for each m frames, generating a key frame containing integrity information associated with said m frames, and authentication information associated with the communications data stream; and inserting said key frame as an m+1th frame into the segmented data stream after m frames of the data stream.

For example, a binary communication data stream, generated by a single party or by communications between two or more parties in multi-party or conference call situations, is captured and segmented into defined data frames. A key frame is generated for each of a number of data frames, the key frame containing integrity and authentication information. The key frame is inserted into the data stream after the data frames, to provide an authenticated data stream comprising the data frames and key frame. The key frame containing the integrity and authentication information may comprise an identification block, an integrity block and a signature block. Depending on computational resources, the key frame may be encrypted, and the key frame may be appended to each data frame or group of data frames, or inserted after each data frame, or a key frame appended at the end of the data stream. The integrity block comprises integrity information to ensure the data integrity of the data stream. The integrity block may be generated by selecting an integrity mask to select a defined bit or bits from each data frame of the data stream as an indicator that the data stream has not been altered. Alternatively a checksum or hash may be created for the that frames to create the integrity block. Thus the present invention provides a system and method of generating a non-repudiatable record of a communications session in real-time or quasi-real-time by creating an authenticated data stream, which for example is applicable to voice communications or other streamed media.

Another aspect of the present invention provides a system for generating an authenticated record of a communication data stream in a network, the system comprising: a network element for capturing a communications data stream; and an authentication module adapted to: segment the communications data stream into m frames of predetermined length; generate a key frame including respective data integrity information in respect of each frame of the segmented data stream; and insert the key frame as the m+1th frame into to the segmented data stream.

In other aspects of the present invention there is provided for the identification block comprising any one or more of date, time and location information for the communication session. The data integrity block containing data generated for each frame by any one or more of a bit position mask; a least significant bit position in each frame; a most significant bit position in each frame; a Secure Hash Algorithm (SHA); and a checksum. The signature block comprising a unique digital signature of at least one party to the communications data stream provided by a trust module adapted to generate a respective digital signature for at least one party involved in the communications data stream.

The network element may also comprise a node of the public switched telephone network (PSTN), and the communications data stream is generated by copying pulse code modulation (PCM) data from time division multiplex (TDM) frames. The authentication module can be implemented in a node of a broadband data network, and the network element further adapted to encapsulate the communications data stream for transport through the broadband data network to the authentication module. The network element may also comprise a node of a broadband data network, and the source data stream is generated by copying Protocol Data Units (PDUs) associated with the communications data stream. The broadband data network is either one of an Internet Protocol (IP) network and an Asynchronous Transfer Mode (ATM) network. The segmented communications data stream may be encrypted by a' security module. In addition, the communications data stream may be stored at a data repository if required.

Further features and advantages of the present invention, as well as the structure and operation of various embodiments of the present invention, are described in detail below with reference to the accompanying drawings.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present invention provides systems and methods for generating a non-repudiatable record of a communication session. Embodiments of the invention are described below, by way of example only, with reference to FIGS. 1-5.

As described below a system and method is provided for a continuously authenticating data in a real-time or quasi-real-time environment and is particularly applicable to voice and other streamed media communications, for example a binary data communication stream. A communication data stream is captured by a network element on the data network and provided to an authentication module. The authentication module may function as part of the network element or be independent of the network architecture. The authentication module segments the data stream into a defined number of data frames m, each frame is n bits in length.

A key frame is generated based upon generated identification, integrity and signature blocks and is then inserted into the data stream after m frames (m+1) to generate an authenticated data stream. The identification block identifies the date and time the communication data stream is received in addition to location information of where the data stream was generated if required. The integrity block is generated by the authentication module to enable verification that the data stream has not be altered by generating an identifier for each frame to determine if any of the data has changed since it was received. The signature block is generated by a trust module or trusted third party to verify that the identity of the parties involved in the communication session. The number of frames m and the length n in bits of each frame is determined by the level of authentication provided. The smaller the number of frames m or the length of the frames n are, more data will be inserted into the data stream by insertion of the key frame.

The data stream is then preferably stored at a trusted data repository on the network. The authenticated data stream provides a reliably authenticated record of the communication which can then be accessed at a later time to verify validity of the communication in addition to verifying the integrity of the data and the parties involved in the communication.

Thus a non-repudiatable record of a communications data stream is provided for real-time and quasi-real-time data streams, but is also applicable to non-real time data communication sessions.

The system and method, according to embodiments of the present invention provide for authenticating a call or data stream which typically will be clear (unencrypted). The method and system is, however, also applicable to encrypted data streams. Specific embodiments of the invention will now be described in more detail.

Figure 1:
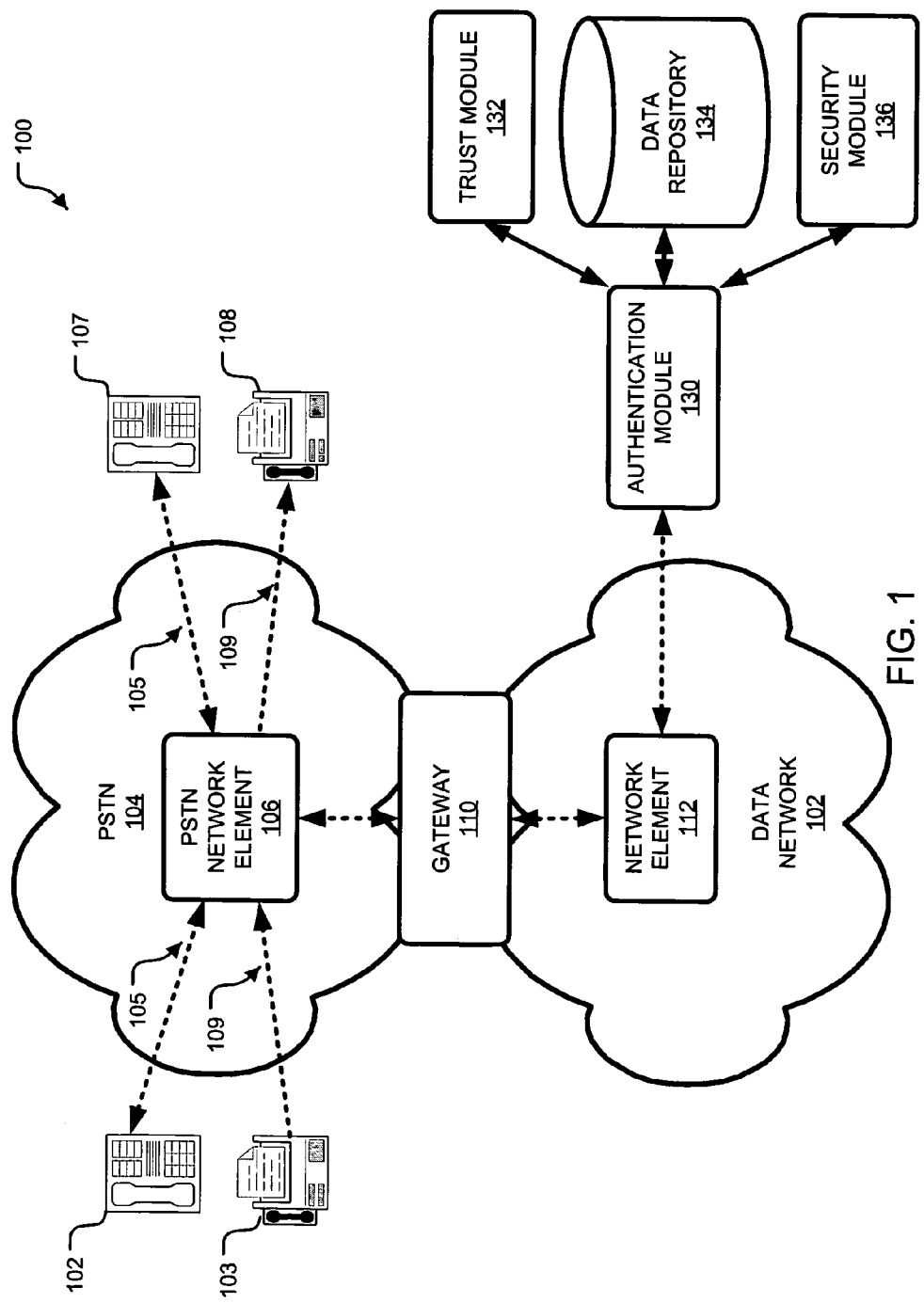
FIG. 1 schematically illustrates PSTN and data network in which methods and systems in accordance with embodiments of the present invention may be utilized.

FIG. 1 shows a voice communication system 100 where a call occurs between two parties via telephones 102 & 107 or a facsimile transmission between facsimile machines 103 & 108. Calls are transmitted via the public switched telephone network (PSTN) 104. In the scenario of a voice call between telephones 102 & 107, links 105 are established between the parties to carry voice data, i.e. data of a voice communications stream, in both directions. In the case of a facsimile transmission, facsimile data is transmitted in one direction 109 from the transmitted facsimile 103 to the receiving facsimile 108. If recording and authentication of the call is required, a PSTN network element 106, which may be an adjunct to network switching hardware or may be part of the network is utilized to capture a copy of the communication stream so as to not interfere with the real-time aspect of the communication. In this example, the communication is transmitted as pulse code modulation format (PCM) data stream in time division multiplex (TDM) frames.

The PSTN network element 106 converts the voice PCM data of the communications stream to a protocol data units (PDUs) transmission format such as Internet Protocol (IP) and transmits the voice data as PDUs via a gateway 110 to a broadband data network 102. In the case where multiple parties are involved in the communication, the PSTN network element 106 would capture PCM data having voice communications from all parties.

The PSTN network element 106 also may also gather authentication information from a user, and provide conversion or translation of information entered by the user during initiation of the call to for providing input to, the authentication module 103 in an appropriate format. User information may be entered by known methods such as Dual Tone Multi-Frequency (DTMF), i.e. by entering data using the telephone keypad during initiation of a call, which is described in further detail below in connection with FIG. 4.

The authentication module 130 obtains positive identification of the originating and/or receiving parties by interaction with the trust module 132 based upon the information entered by the parties of the communication. Identification of the parties is by unique credentials such as a digital signature. The trust module 132 may be part of the authentication module 130 or be provided be a service offering or software provided by a trusted third party on the broadband data network such as for example RSA Security Solutions™, Verisign™ or Entrust™ or others. The trusted third party is not directly associated with either of the parties involved in the communication providing increasing the level of confidence in the integrity of the identity data. A security module 136 may also provide security information for public/private key encryption of the data stream based upon the credentials of the parties. The security module 136 may be provided by a third party or service if security information is not incorporated as a function of the trust module 132.

A data network element 112 on the data network 102, receives the PDUs from the gateway 110 and forwards the PDUs to an authentication module 130. The data network element 112 may for example, be routing or switching hardware on the data network 102 or may reside as software in the network infrastructure hardware.

The authentication module 130 adds authentication information in the form of key frame data, to the data stream and stores the authenticated data stream in a data repository 134. The data repository 134 may be any form of digital data storage such as a hard-drive array or a non-volatile storage medium. The stored authenticated data stream can be retrieved as required from the data repository 134.

The stored data communication record can be verified against editing, denial or repudiation and can be used for transactions (e.g. eBay™) purchase, credit card transaction, house purchase offer, or can be used to identify time of filing of a document for copyright registration purposes or legal filing (e.g. a will). The present invention can also be used for certification of "wire tap" evidence (date, time and place) when used by law enforcement authorities. Contractually binding documents or contractually binding verbal communications will be able to be made using this technique. The conversation can be certified as having been unchanged since being recorded, and that it was recorded on a certified date and time. Authentication is not provided that the data source has not changed in the network, but instead that whatever is heard or received by the other party is what is recorded. In other words, the recording is a certified document recording the conversation or communication as received by both parties. For example, the transmission of a facsimile document can be captured during transmission and to ensure that the document is not tampered with, thereby providing a means of authenticating such facsimile if required.

The stored authentication data stream provides a verifiable copy of communication to aid in determining that a source stream has not been altered and that the integrity of the authenticated data stream and the identity of the participants. Verification of the authenticated data stream can be performed by utilizing the identification data to verify the date, time and location (if provided) that the data stream was generated, the integrity data to verify that the stream has not been altered since it was authenticated, and the signature data to determine the parties involved. Verification may be performed by recreating the key frame data based upon a copy of the source data stream provides by one of the parties involved in a manner similar to when the data stream was captured and comparing it to the stored copy. Any alterations or inconsistency in the data stream would then be identifiable. Alternatively, the key frame data may be extracted from the stored authenticated data stream to verify that data has not been altered and identify the participants and to recreate the source data stream if no source for comparison is available.

Figure 2A:
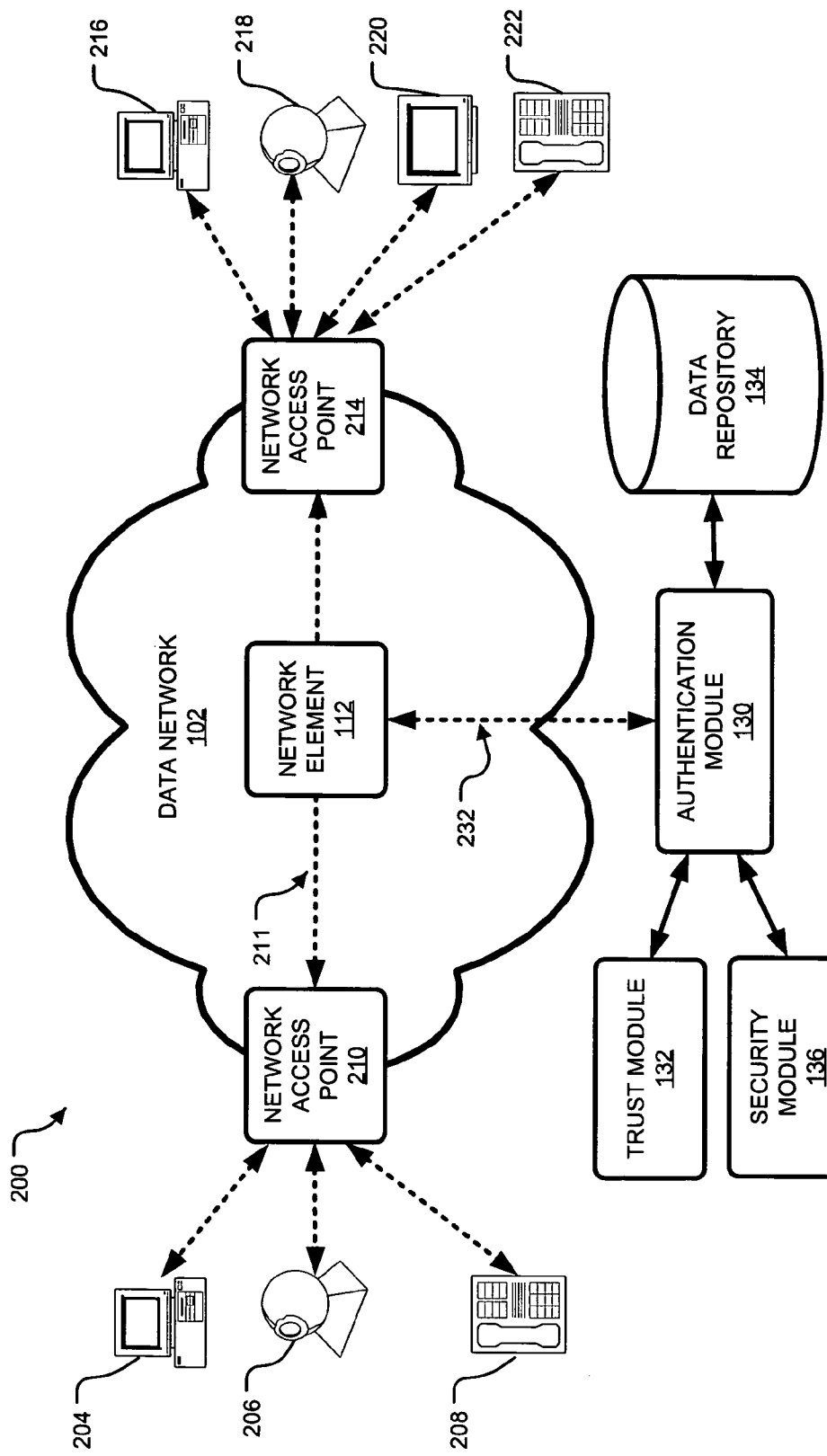
FIGS. 2A to 2C schematically illustrate a data network in which methods and systems in accordance with embodiments of the present invention may be utilized.

FIG. 2A shows representative embodiment of a system 200 in accordance with the present invention wherein a data network 102 is the primary transport. FIG. 2A is particularly applicable to connection oriented broadband data networks such as Asynchronous Transfer Node (ATM) or Multiprotocol Label Switching (MPLS) based networks wherein the data communication will transit specified network elements. Data communication between devices including but are not limited to personal computers 204 & 216, video or web cameras 206 & 218, voice-over-IP handsets (VOIP) 208 & 222 and viewing equipment 220 provide or receive data streams which require authentication. Data generated from the devices enters the data network via access points 210 & 214. The data would typically be transported through the data network 102 to the end destination by transiting various network elements 112, such as routers, hubs and switches.

As shown in FIG. 2A, a network element 112 forwards the data traffic between devices via a communication data stream 211. Data may be transported between multiple devices and there may also be more than two parties involved in the communication. The network element 112 simultaneously provides a copy of the protocol data unit (PDUs) via data stream 232 to the authentication module 130 connected to the data network 102. Authentication occurs in a similar manner as discussed in relation to FIG. 1 and the authenticated data stream is stored in data repository 134 for later verification and retrieval.

During initiation of the data communication, which is described below in further detail in connection with FIG. 5, the identity of the users or devices in the data communication can be verified by trust module 132. Trust module 132 may be part of the authentication system or be part of a system provided by a trusted third party as previously discussed. A security module 136 may also provide security information for public/private key encryption of the data stream for authentication.

Figure 2B:
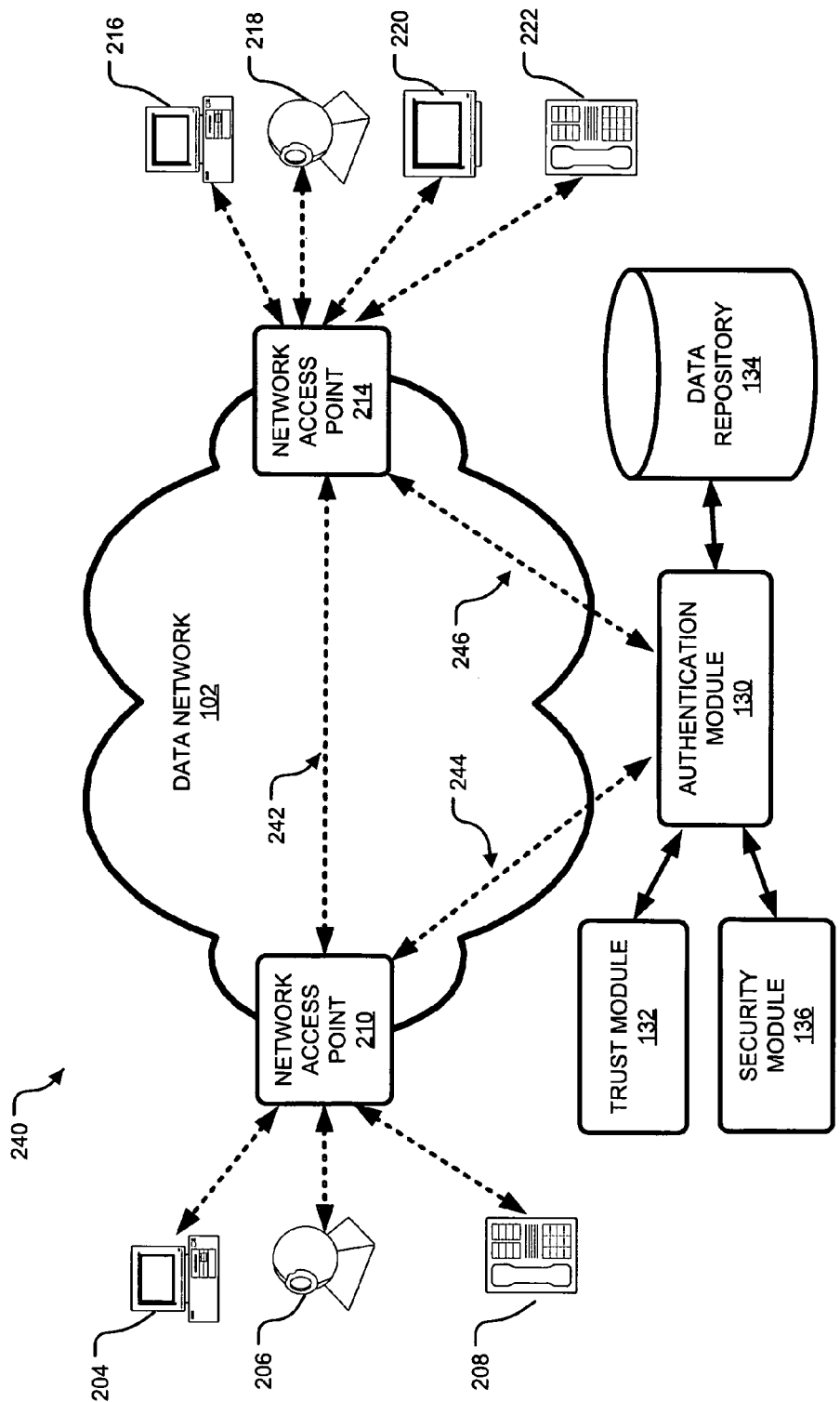

FIG. 2B shows a representative embodiment where data communication between devices occurs directly through a link 242 between the network access points 210 & 214. Each access point copies the data and sends the copy via secondary data streams 244 & 246 to the authentication module 130. Only one secondary stream 244 or 246 is required which would then carry traffic travelling in either direction between 210 and 214. In two-way application, such a VOIP or video conferencing, data from both or multiple parties may be routed to the authentication module 130 by one of the network access points 210 or 214 or by both depending on the configuration of the broadband data network or communication session. The network access points 210 & 214 forward data traffic between devices attached to the network to the authentication module 130. Alternatively, broadcast or multicast techniques from the source device may be utilized, eliminating the requirement of the network access points to provide forwarding.

Figure 2C:
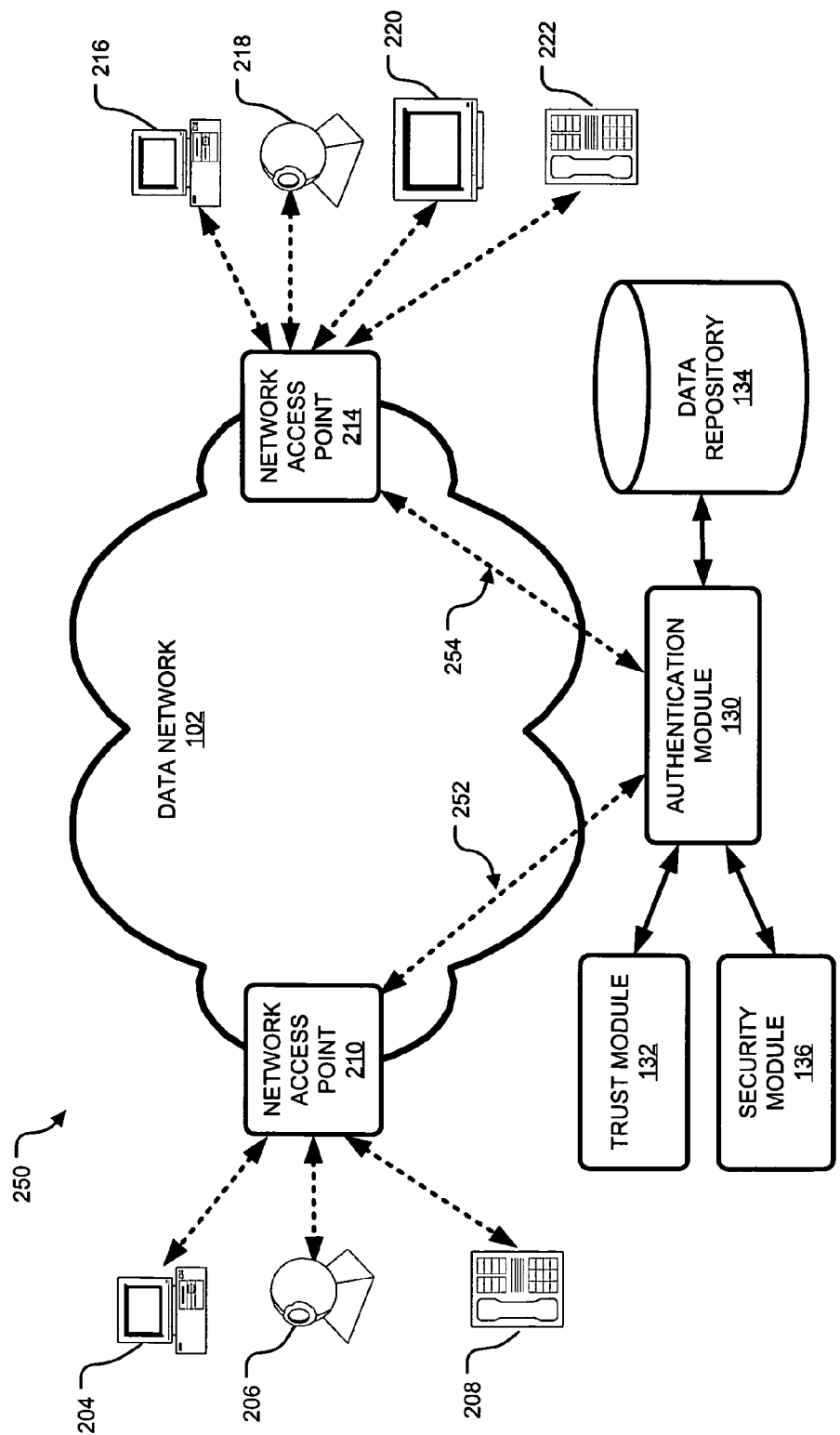

FIG. 2C shows an representative embodiment in which data communication on the broadband data network 102 is routed directly to the authentication module 130 via data streams 252 and 254. In this embodiment the authentication module 130 provides forwarding of the data between access points 210 and 214. The authentication module 130 may provide forwarding when the network latency is sufficiently low to ensure timely delivery without impacting the quality of the communication. In one-way application such as surveillance video 206 sent to monitor 220, the data stream can be directed to the authentication module 130 for forwarding without concern of impacting the service quality or the nature of the data stream. In systems where low latency is required the system configurations shown in the FIGS. 2A & 2B are most applicable.

It should also be noted that in cases such as surveillance video or voicemail, which is a one-way stream that requires certification of no tampering, the digital signature may be provided at or near the source as part of the data stream so that any changes introduced in the network cause the authenticity test to fail.

Figure 3:
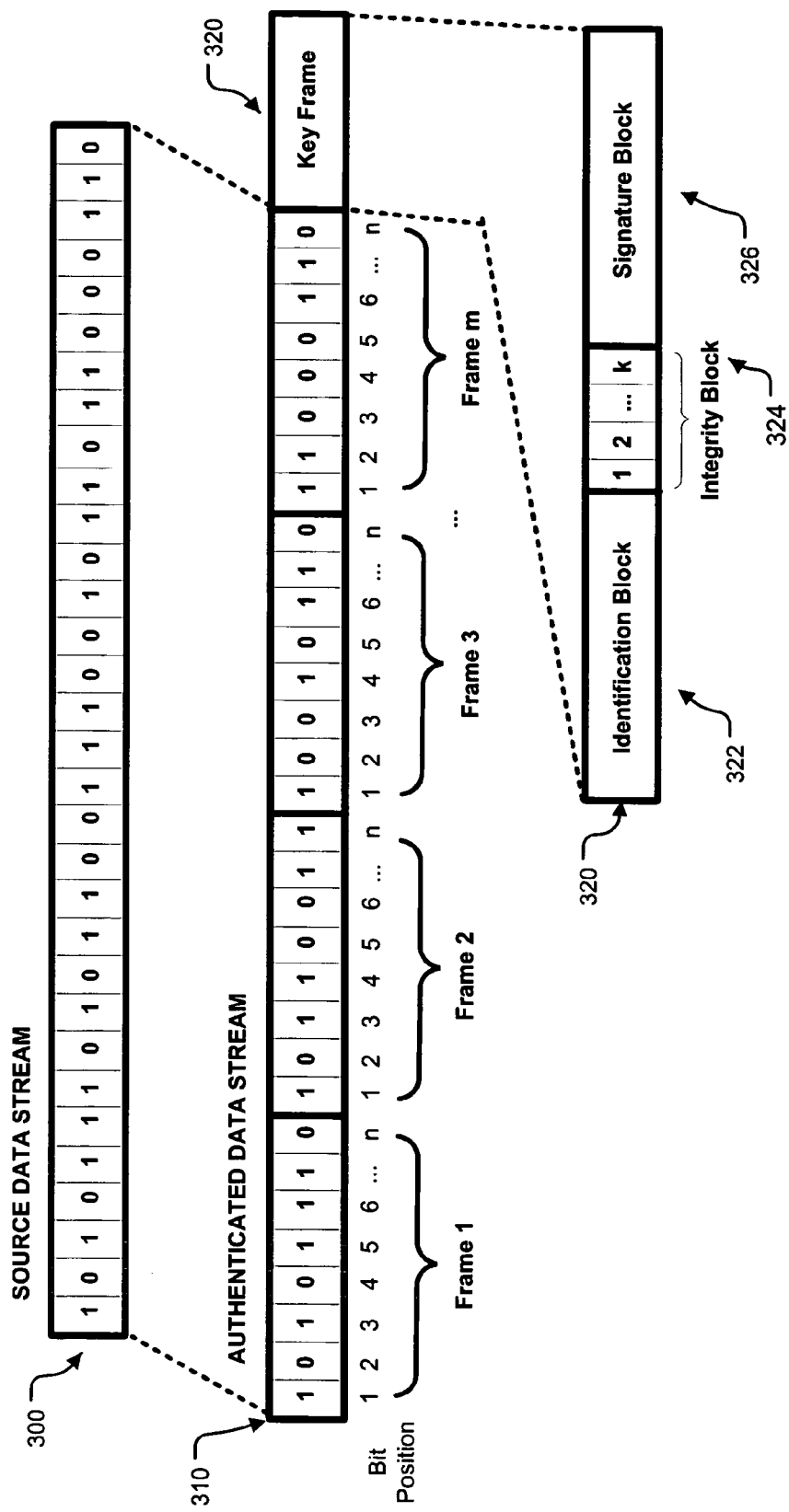
FIG. 3 illustrates a source data stream and an authenticated data stream in accordance with an aspect of the present invention.

FIG. 3 shows a representative source binary data stream 300 for the purpose of demonstrating the technique of the present invention. The source data stream 300 may be formed by protocol data units (PDUs) such as Internet Protocol (IP) packets, data frames such as Asynchronous Transfer Mode (ATM) frames or PCM data from digitized voice. The actual format of the source data stream 300 does not impact the authentication process. The sources data stream 300 is sent or forwarded to the authentication module 130 as discussed previously in connection with FIGS. 1 and 2A-C. The received source data stream 300 is divided into m frames of a defined bit length n. The bit length may be defined based upon the type of integrity check determined by security and overhead restrictions. For example, frame 1 is defined as n bits in length and all successive frames, frame 2, frame 3 up to frame m are of the same length n. In the example shown n=8 bits.

In order to ensure that the frame cannot be tampered or altered, a key frame 320, containing the non-repudiatable authentication data, is added to the data stream 310.

In an representative embodiment the authentication data 320 contains three blocks of information. An identification block 322, which may contain information such as time, date and location data, an integrity block 324 and a signature block 236. The identification block also serves for identifying the type of authentication method used to create the integrity block 324 as the integrity block 324 may be generated by various methods as discussed below.

The size of the integrity block 324, is dependent on the integrity mask used. The integrity block 324 may be created by utilizing a selected bit position, 1 to n, selected from each frame within the data stream 310 and copying the selected bit to the integrity block 324. The bit position may alternatively be selected by a bit mask which may represent a different bit in each frame or by a specific bit position such as low significance bit (LSB). In the example of a voice stream this will be bit 1 or bit 9 (LSB of an 8 bit group). Selecting bits in a non-predictable fashion increases the possibility that tampering with the data frames can be detected. These bits are recorded for m frames in the integrity block 324. The size of the integrity block 324 of k bits in length is dependent on the generation method selected.

Alternatively, the integrity block 324 may be generated by a checksum for each frame or block of frames or by utilizing a technique such as Secure Hash Algorithm (SHA) which takes a message of less than $2^{64}$ bits in length and produces a 160-bit message digest. The digest is designed so that it should be computationally expensive, and in practice considered impossible, to find a data which matches a given hash.

The signature block 326 may be created using a trust hierarchy such as public key infrastructure (PKI). Digital Certificate Authorities, represented by trust module 132, and other registration authorities that verify and authenticate the identity of each party may be involved in any data communication. Authentication may be provided for sender and/or receiver, whether an individual user, or for example another entity such as a location, or an IP address. The trust module 132 may encompass multiple functions in one module or the function may be distributed to multiple providers or service entities. Similarly the trust module 132 and the security module 136 may be part of the authentication module 130 or be provided by a third party.

Once the key frame 320 is constructed it may also be encrypted by the security module 136 prior to insertion to the data stream 310. The key frame 320 can optionally be converted into a more compact digital signature representing the complete transaction. The key frame 320 is then inserted into the data stream after the predefined number for frames m at position m+1. Depending on resource and computational availability, the key frames 320 may be appended to each data frame (m=1) to provide protection in the event of lost packets.

Verification of the data integrity can then be performed by using the key frame integrity block to determine if data in the data stream has been altered after capture and storage. Alternatively a copy of the original source data stream 300 may be compared to the authenticated data stream 310 by recreating the key frame data block, in a manner similar to the capture method described and identifying discrepancies. The key frame data 320 also can be extracted and the identity of the parties involved determined by accessing the trusted module 132 hosted by the trusted third party.

Figure 4:
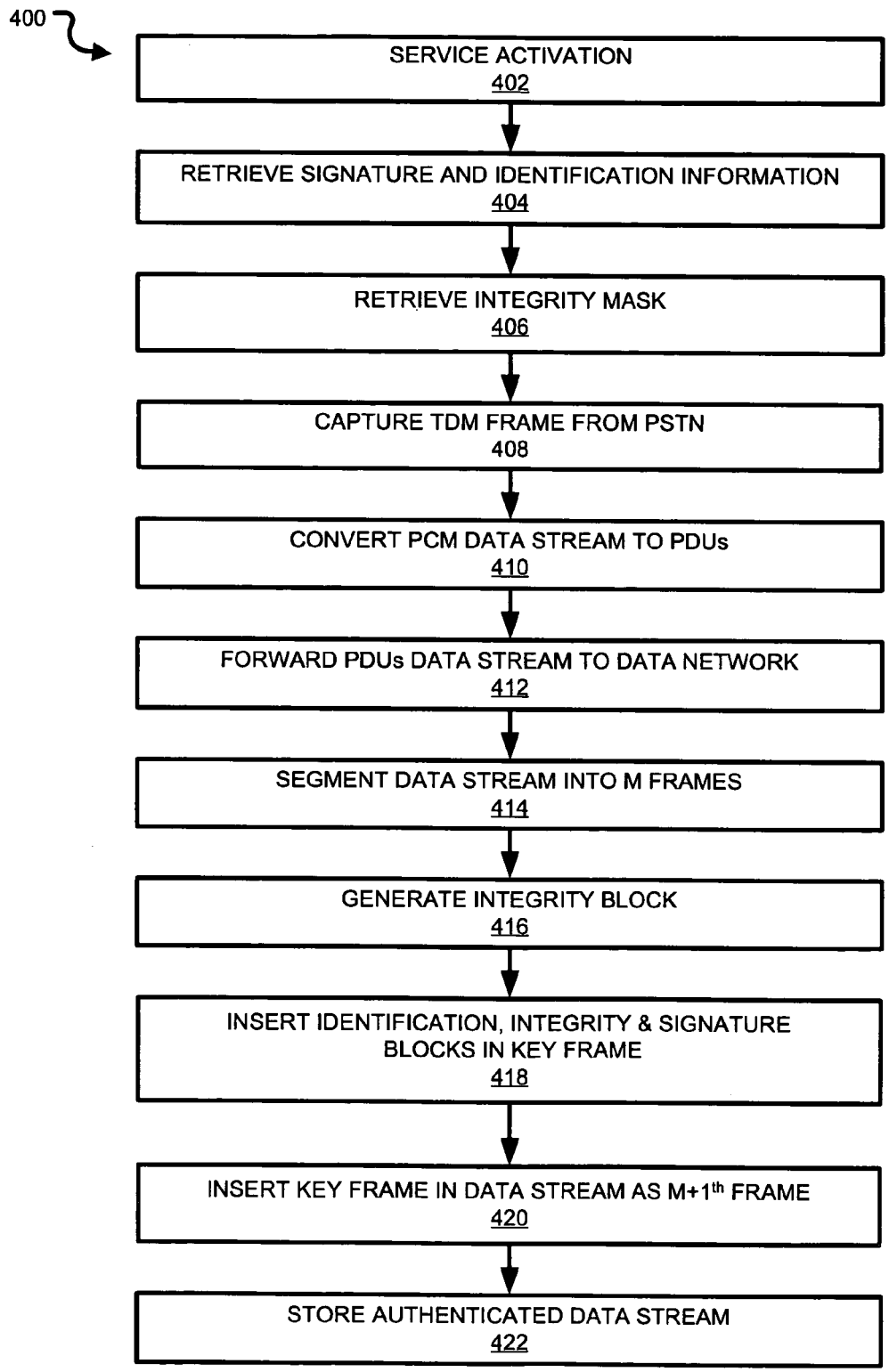
FIG. 4 is a flow chart illustrating a method for generating an authenticated data stream of a PSTN communication in accordance with an embodiment of the present invention.

FIG. 4 is a flow chart showing a method of inserting authentication information in a communication data stream for a voice or facsimile communication in a PSTN network, as shown in FIG. 1 to provide a non-repudiatable authenticated record of a data communication stream. The method commences with service activation at step 402. The service may be activated by a calling party for example telephone 102 as shown in FIG. 1, through the telecommunications service provider. This may involve entering a service code, for example a common service activation code, such as *67, either during or prior to commencing the call to activate the service for the duration of the call. Alternatively, a phone number of a service provider may be required for access or the service may be automatically activated when a call is made to or from a specific phone number. During the initial stages of the call the receiving party 108 may also be required to enter an identification code or a personal identification number (PIN) to confirm their identity. This information would be verified against information provided by the trust module 132 at step 404 and utilized to create the signature block 326 by the authentication module 130. The voice communication can then be initiated through the PSTN to the receiving party 108.

At step 404 information such as date, time, location of the calling or receiving party would also be retrieved by the authentication module 130 to create an identification block 322 for inclusion in the key frame 320. The mask utilized for creation of the integrity block is then retrieved at step 406. As discussed in connection with FIG. 3, the mask may be created by various methods dependent on the user requirements. The integrity mask may be determined by a service level agreement with the service provider based upon the amount of security or resources required for capturing the data stream.

Once the service has been established, the network element 106 captures a copy of the TDM frame from the PSTN communication stream comprising the PCM information at step 408. At step 410 the PCM data stream is converted to a protocol data units (PDUs) consistent with the transport broadband data network such as Internet Protocol (IP) packets. The PDUs are then forwarded to the broadband data network 102 at step 412 through the gateway 110 to the authentication module 130. The received PDUs, comprising the communication data stream is then segmented into m frames at step 414. An integrity block 324 is then generated for the m frames at step 416. The key frame 320 is then created by inserting the identification block 322, the integrity block 324 and the signature block 326 at step 418 in the key frame at step 418. The constructed key frame 320 is then inserted into the data stream 300 as the m+1th frame resulting in the authenticated data stream 310 at step 420. The authenticated data stream 310 may then be encrypted as required. The authenticated data stream 310 is then stored at a data repository 134 at step 422.

Figure 5:
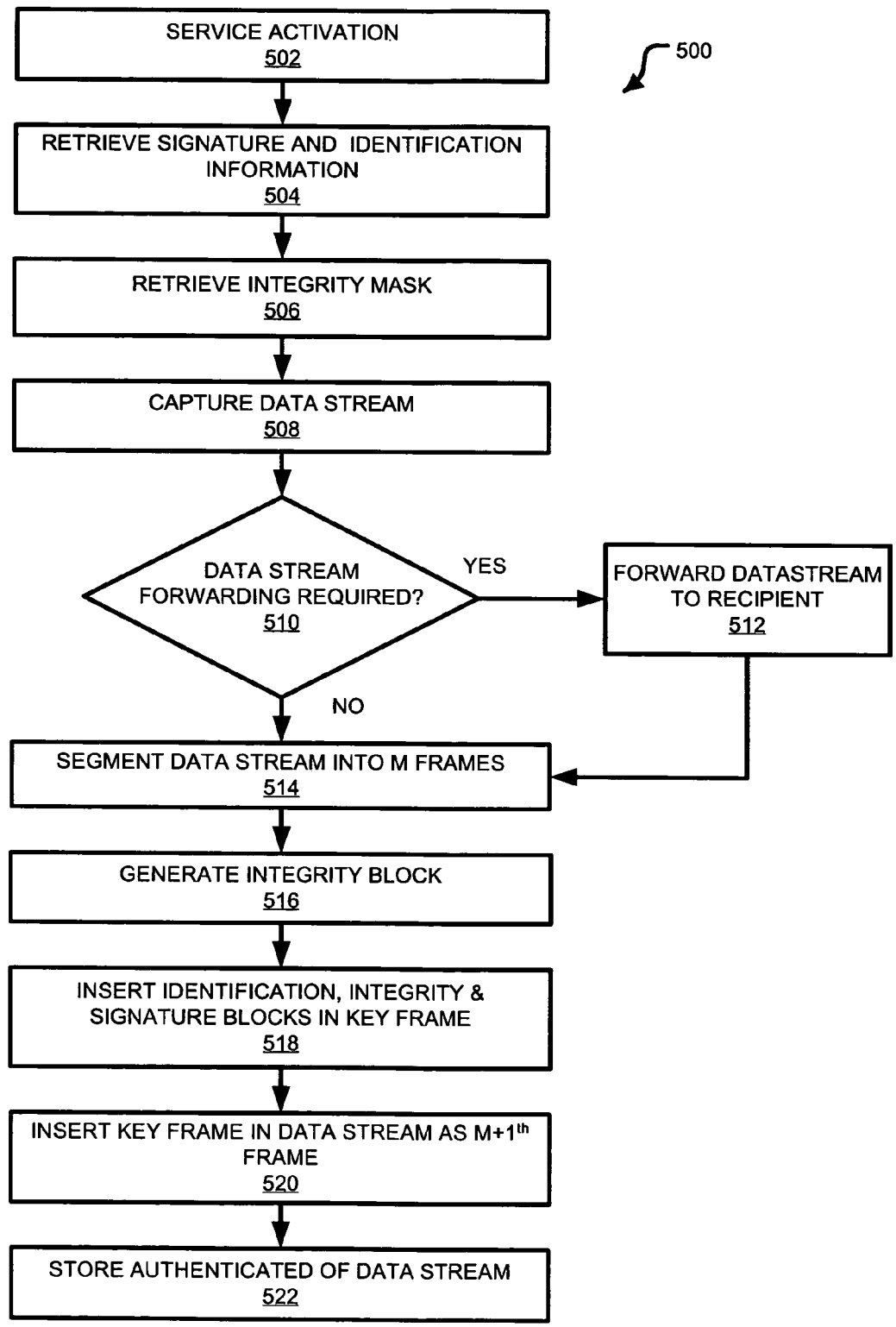
FIG. 5 is a flow chart illustrating a method for generating an authenticated communication data stream in accordance with an embodiment of the present invention.

FIG. 5 is a flow chart showing a method of inserting authentication information in a communication data stream in broadband data network to provide a non-repudiatable authenticated record of a data communication stream, as shown in FIGS. 2A, 2B and 2C. In contrast to the method described in connection with FIG. 4, the method of FIG. 5 is for capturing data communications occurring within the broadband data network. The method 500, commences with service activation at step 502. The service may be activated by software at the authentication module 130 which may require an activation code such as a user ID (identification) or PIN code or be based upon a dedicated location or IP address activation. A similar activation procedure may be required by the receiving party to initiate the service. The user information is verified and retrieved from the trust module 132 at step 504 and utilized to create the signature block 326 by the authentication module 130. At step 504 information such as date, time, location would also be retrieved by the authentication module 130 to create the identification block 322 for inclusion in the key frame 320. The location information may be an IP address, domain identification or by Global Positioning System (GPS) coordinates. The mask utilized for creation of the integrity block 324 is retrieved at step 506. As discussed in connection with FIG. 3, the mask may be created by various methods dependent on the user requirements or service level agreement based upon the amount of security or resources required for capturing the data stream.

The communication data stream is then captured at step 508 at the authentication module 130. Depending on the configuration of the broadband data network as described in connection with FIGS. 2A-2C network traffic may be forwarded to the authentication module 130 by network elements 112 on the data network 102. In addition the authentication module 130 may be required to forward the received data stream to the recipient user or device, (YES at step 510). The authentication module 130 would then forward the data stream at step 512. Otherwise, the data stream is segmented into m frames at step 514. The authentication module 130 then generates the integrity block 324 for the m frames at step 510. The key frame 320 is then constructed by inserting the identification block 322, the integrity block 324 and the signature block 326 at step 518. The constructed key frame 320 is then inserted into the communication data stream as the m+1th frame at step 520. The authenticated data stream 310 is then stored at a data repository 134 at step 522.

The embodiment(s) of the invention described above is(are) intended to be representative only. The scope of the invention is therefore intended to be limited solely by the scope of the appended claims.

The invention claimed is:

1. A method, in a public switched telephone network (PSTN), for generating an authenticated record of a communications data stream comprising:

receiving, via the PSTN, a data signal representing authentication information associated with the communications data stream;
capturing, at a node of the PSTN, a data signal representing the communications data stream;
segmenting the data stream into defined frames;
for each m frames, generating a key frame containing integrity information associated with said m frames, and authentication information associated with the communications data stream;
inserting said key frame as an m+1th frame into the segmented data stream after m frames of the data stream; and
generating a data signal representing the authenticated record of the communications data stream, the authenticated record including the communications data stream and the key frame;
wherein the communications data stream is generated by copying pulse code modulation (PCM) data from time division multiplex (TDM) frames.

2. The method of claim 1, wherein the communications data stream is a real-time or quasi-real-time data stream.

3. The method of claim 1, wherein the key frame comprises an identification block, an integrity block and a signature block.

4. The method of claim 3, wherein the identification block comprises any one or more of date, time and location information for a communication session represented by the communications data stream.

5. The method of claim 3, wherein the data integrity block comprises data generated for each frame by any one or more of:
a bit position mask;
a least significant bit position in each frame;
a most significant bit position in each frame;
a Secure Hash Algorithm (SHA); and
a checksum.

6. The method of claim 3, wherein the signature block comprises a unique digital signature of at least one party to the communications data stream.

7. The method of claim 1 wherein the communications data stream is between two or more parties.

8. The method of claim 1 further comprising a step of encrypting the segmented data stream.

9. The method of claim 1 further comprising the step of storing the authenticated record of the communications data stream at a data repository.

10. A system for generating an authenticated record of a communication data stream in a network, the system comprising:
a network hardware element for capturing a communications data stream, the network hardware element comprising a node of a public switched telephone network (PSTN); and
an authentication module adapted to:
segment the communications data stream into m frames of predetermined length;
generate a key frame including respective authentication and data integrity information in respect of each frame of the segmented data stream; and
insert the key frame as the m+1th frame into to the segmented data stream;
wherein the communications data stream is generated by copying pulse code modulation (PCM) data from time division multiplex (TDM) frames.

11. The system of claim 10 wherein the communications data stream is a real-time or quasi-real-time data stream.

12. The system of claim 10 wherein the key frame comprises an identification block, an integrity block and a signature block.

13. The system of claim 12 further comprising a trust module adapted to generate a respective digital signature for at least one party involved in the communications data stream for the signature block.

14. The system of claim 10 further comprising a security module for encrypting at least the segmented data stream.

15. The system of claim 10 wherein the data integrity information comprises any one or more of:
a bit position mask;
a least significant bit position for each frame;
a most significant bit position for each frame;
a Secure Hash Algorithm (SHA); and
a checksum.

16. The system of claim 10 wherein authentication module is implemented in a node of a broadband data network, and the network element is further adapted to encapsulate the communications data stream for transport through the broadband data network to the authentication module.

17. The system of claim 10 wherein the network element comprises a node of a broadband data network, and the communications data stream is generated by copying Protocol Data Units (PDUs) associated with the communications data stream.

18. The system of claim 17 wherein the broadband data network is either one of an Internet Protocol (IP) network and an Asynchronous Transfer Mode (ATM) network.

* * * * *